ELECTRONIC SWITCHING IN SIGNALLING SYSTEMS

Filed June 12, 1957 4 Sheets-Sheet 1

Inventor:
Otto Kneisel
By [signature] Atty.

May 15, 1962 O. KNEISEL 3,035,124

ELECTRONIC SWITCHING IN SIGNALLING SYSTEMS

Filed June 12, 1957 4 Sheets-Sheet 2

Inventor:
Otto Kneisel.
By [signature] Atty.

Inventor.
Otto Kneisel.
By [signature] Att'y

May 15, 1962 O. KNEISEL 3,035,124

ELECTRONIC SWITCHING IN SIGNALLING SYSTEMS

Filed June 12, 1957 4 Sheets-Sheet 4

Inventor:
Otto Kneisel,

By [signature] Atty

United States Patent Office 3,035,124
Patented May 15, 1962

3,035,124
ELECTRONIC SWITCHING IN SIGNALLING SYSTEMS

Otto Kneisel, Munich-Grosshesselohe, Germany, assignor to Siemens and Halske Aktiengesellschaft Berlin and Munich, a corporation of Germany
Filed June 12, 1957, Ser. No. 665,219
Claims priority, application Germany July 16, 1956
13 Claims. (Cl. 179—18)

This invention relates to electronic switching in signalling systems and is particularly concerned with a switching arrangement for electronic selectors, particularly for indirect or by-pass routing in telephone systems.

The exchange area layout of large systems, such as that of the German National Toll Line System, provides as is known a star-shaped network with toll centers as toll traffic center points of the subsidiary offices, with primary offices as toll traffic center points of the subsidiary offices and with regional central offices as toll traffic center points of the primary offices. The regional central offices are interconnected to each other by a cable network. The connections are made as a rule via the different toll traffic center points in forward and backward direction (office code path). Since the office code path is not always the shortest in the case of calls which are intended for offices adjacent the calling office, the exchange office layout also provides tie-line or transverse paths between the toll subsidiary offices, primary offices and regional central offices. The calls then first of all seek in each case to take the shortest tie-line path and if it is busy, the next shorter, etc., and finally the office code path. This technique of indirect or by-pass routing requires re-routing selectors at the toll-traffic center points for the automatic re-routing in the different directions of traffic, as well as decoding or evaluating devices, the latter mostly centralized for a plurality of lines, for the office codes determining the directions.

In the case of so-called direct dialing in which there is no office code path in the strict sense but only a plurality of connecting paths in a selectable sequence, there are provided in the offices direction selectors and re-routing selectors for automatic re-routing, as well as central decoding devices which evaluate the direction codes.

The object of the indirect or by-pass routing must be to make a connection as quickly as possible, without stagewise hunting of the available tie-lines, on the shortest direction which happens to be free or on the code path.

In direct dialing it is already known to prevent the direction selectors from hunting in vain in line groups of individual directions which are already occupied, but to come immediately to the re-routing direction which just happens to be free by common disconnecting relays in the centralized decoding devices, depending on whether the trunk group of the various directions available is or is not busy (German Patents 764,958 and 856,317).

These known arrangements require multiple-wiper control switches and decoding selectors, that is, a large number of mechanical switching means. Furthermore, they require a great amount of time for the indirect routing; the rapidity of making connections and thus the most favorable possibility of utilizing the connecting devices suffer from this condition.

The present invention now seeks on the one hand to avoid as many mechanical switching means as possible and on the other hand to assure effecting connections as rapidly as possible. This is achieved by the use of an electronic selector having a plurality of inputs or input circuits and outputs or output circuits in connection with which the availability of an output is marked by a given potential and, by the marking of a given input, the latter is first of all switched to a given output and if this output is busy, to another idle output. The selector is in accordance with the invention constructed so that one input thereof is in each case coupled with an associated selector output via an electronic switch and the inputs of the selector are coupled via rectifiers with corresponding pass direction with the electronic switches of other outputs in a stagewise manner and in selectable sequence in such a way that upon the marking of one output by a blocking potential, the selector input marked by a certain potential is rerouted to the next selector output marked by a potential indicating idle condition thereof.

The invention will now be explained with reference to the accompanying drawings, wherein.

Figure 1:
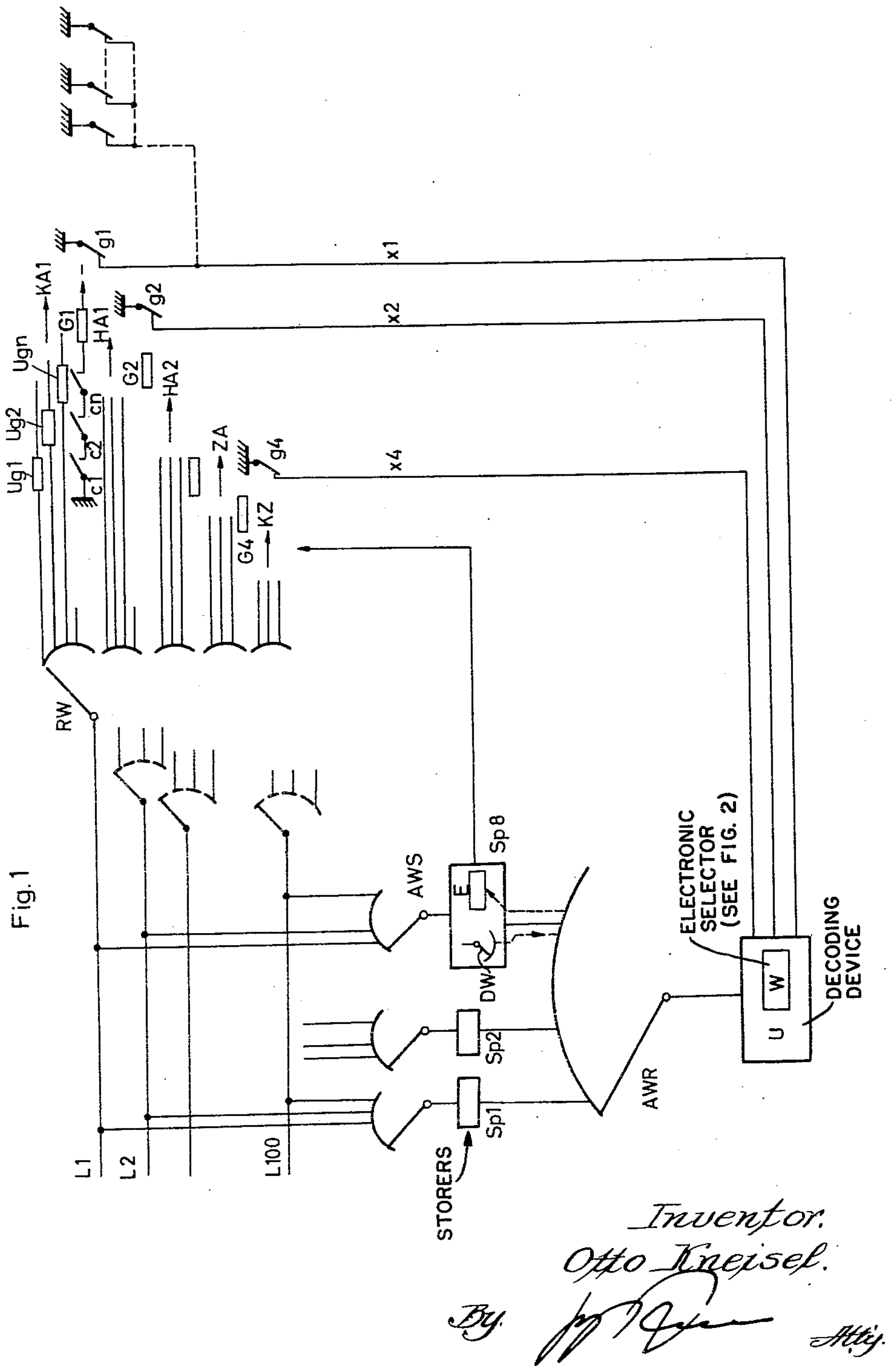
FIG. 1 is a general explanatory diagram.

As may be noted from the general circuit diagram of FIG. 1, the electronic selector W is located in a decoding device U at any desired toll traffic center point. The decoder U is operatively related via a connecting selector or coupler AWR jointly to a group of storage devices or registers *Sp*1 to *Sp*8 and the latter are in their turn respectively associated via the connecting selectors AWS with a large group of incoming trunks L1 to L100. To each of the trunks L there is connected a direction selector RW, for instance a hundred-point rotary motor selector which has access to the different tie directions, for instance to the code path KZ, a regional central office ZA, two primary offices HA1 and HA2 which lie within the region of the regional central offices ZA and to a toll subsidiary office KA1 which lies within the region of the primary office HA1. If a call comes in via a trunk L, the connecting selector AWS of an idle register or storage device is actuated to seek the calling trunk. The register *Sp*8 may for instance be connected to the calling trunk L1. The register *Sp*8 receives the code sent out by the calling subscriber via trunk L1 in a switch device DW. After completion of the storing or registration, the register *Sp*8 connects itself via the connecting selector AWR to the decoder U and transmits to it the code numbers dialed by the subscriber. From the code numbers a so-called code point KP is marked in the decoder U (for instance via a rectifying gate) which, corresponding to the direction associated with the selected code, designates a given input of the electronic selector W by the connecting of potentials, for instance ground. Via the selector outputs of selector W, result relays E in the register *Sp*8 are energized individually or in a certain combination, such result relays marking the desired direction, for instance the direction KA1 at the direction selector RW. If a trunk is idle in this direction, the direction selector is set to connect therewith. If no trunk is idle in this direction, the ground potential is removed from the trunk $x1$ by parallel-connected normal contacts (indicated in dotted line) or by series-connected contacts $c1$ . . . $cn$ of corresponding control relays (not shown) and common disconnecting relays G1 . . . G$n$ in the outgoing transmissions U$g$1 . . . U$gn$. As a result, the trunk $x1$ signals to the selector W in the decoder U that all trunks of this group are busy. In this case the output HA1 is marked by the selector rather than the output KA1. As a result, the next tie-direction HA1 at the direction selector is marked by the corresponding result relay E in the register S$p$8. If this trunk group is also busy, the corresponding busy condition is marked at the selector W by way of the trunk $x2$. The selector W thereupon switches the busy input to an output leading to a result relay which marks the next tie-direction. The switch W connects in this way stagewise the result relays for the different tie directions and finally for the code path.

Figure 2:
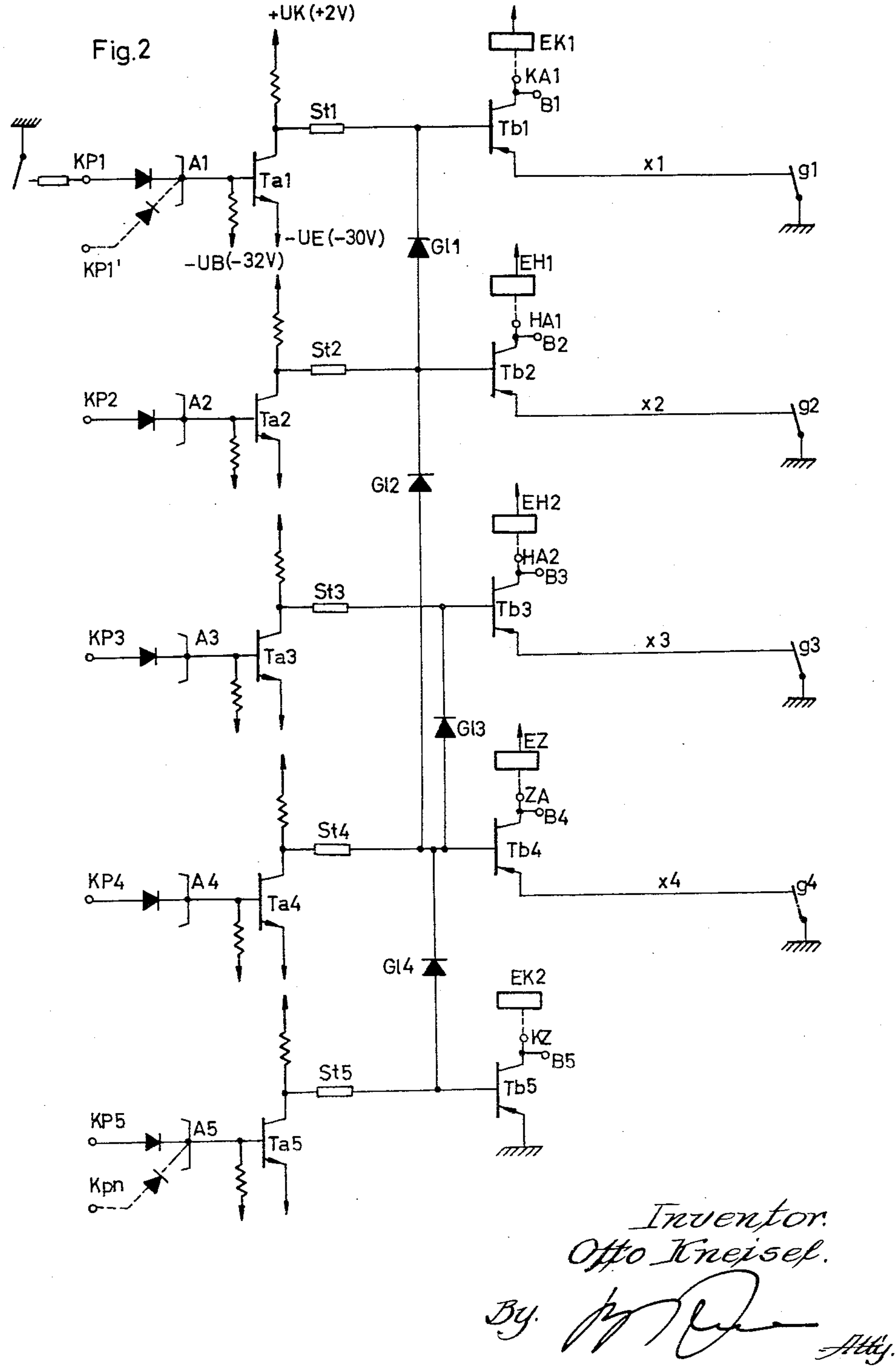
FIG. 2 shows an electronic selector according to the invention for by-pass switching or routing, comprising transistors.

FIG. 2 shows the circuit of the electronic selector W in detail. Each selector input A1 . . . A5 which can be controlled from various code points K$p$1, K$p$1′ . . . K$p$5 . . . K$pn$, is connected via an amplifier unit comprising input transistor T$a$ and output transistor T$b$ with its associated selector output. Each selector input is associated with a given direction; thus input KP1 is associated with tie-direction KA1, input KP2 with direction HA1, input KP3 with direction HA2, input KP4 with direction ZA and input KP5 with the code path KZ. Accordingly, the result relay EK1 is controlled via the output KA1 in the register, the result relay EH1 via the output HA1, the result relay EH2 via the output HA2, the result relay EZ via the output ZA and the result relay EKZ via the output KZ. In the decoder U, by the code transmitted by the register in known manner, corresponding to the desired direction, a selector input is seized via the code point by the connecting of a certain potential, for instance, ground. If for instance the code point KP1 is marked, the negative blocking voltage −UB at the base of the transistor T$a$1 will be reduced. The transistor will accordingly become conductive. Current flows in the collector-emitter circuit; as a result of the voltage drop in this circuit, the transistor T$b$1 will become conductive, and current will flow in the collector-emitter circuit which actuates the relay EK1 in the register. The relay marks the direction KA1 at the direction selector. A prerequisite for this operation is that one trunk of this trunk group is still idle, the trunk $x1$ accordingly carrying ground potential.

If no trunk of this group is idle, the contact $g1$ has disconnected the idle potential from the output marking conductor $x1$. Since the output transistor T$b$2 is coupled to the inlet transistor T$a$1 of stage S$t$1 via the rectifier G11, transistor T$b$2 will now become conductive, provided that there is still a trunk idle in this trunk group. As a consequence, the result relay EH1 in the register is connected, which marks the direction HA1 at the direction selector. If no idle trunk is found in this trunk group, the idle potential is removed from transistor T$b$2 by the disconnecting contact $g2$. The outlet transistor T$b$4 of stage S$t$4 is now connected to the inlet transistor T$a$1 via the rectifiers G11, G12. If a trunk is idle in this trunk group, the transistor will become conductive and the result relay EZ will respond and mark the direction ZA at the direction selector. If no trunk is idle in the corresponding trunk group, the input KP1 is connected via the rectifiers G11, G12, G14 to the output transistor T$b$5. The latter becomes conductive and connects the result relay EK2 which marks the code path KZ at the direction selector. If there is no idle trunk in the code path, the subscriber receives busy signal in known manner.

Wrong couplings cannot occur in this selector circuit for, if for instance outlet KA1 and output HA1 are marked idle by closed disconnecting contacts $g1$ and $g2$, only the output transistor T$b$1 will become conductive while the output transistor T$b$2 for the next tie-direction remains blocked. The voltage drop in the base-emitter circuit of transistor T$b$1 is less than the voltage drop at the rectifier G11 in the connected emitter-base circuit of the transistor T$b$2. The transistor T$b$2 therefore receives sufficient blocking potential.

The drawing shows clearly how the indirect routing occurs upon a marking of another selector input, for instance via the code point KP3. In this case, the direction HA2 is first of all marked via the output HA2 and the result relay EH2 at the direction selector. If the latter is busy, the output transistor T$b$4 of stage S$t$4 is connected via the rectifier G13 to the input transistor T$a$3. The input is therefore first connected to the direction ZA. If it is likewise busy, the input KP3 is coupled via rectifiers G13, G14 with the output KZ which marks the code path.

Figure 3:
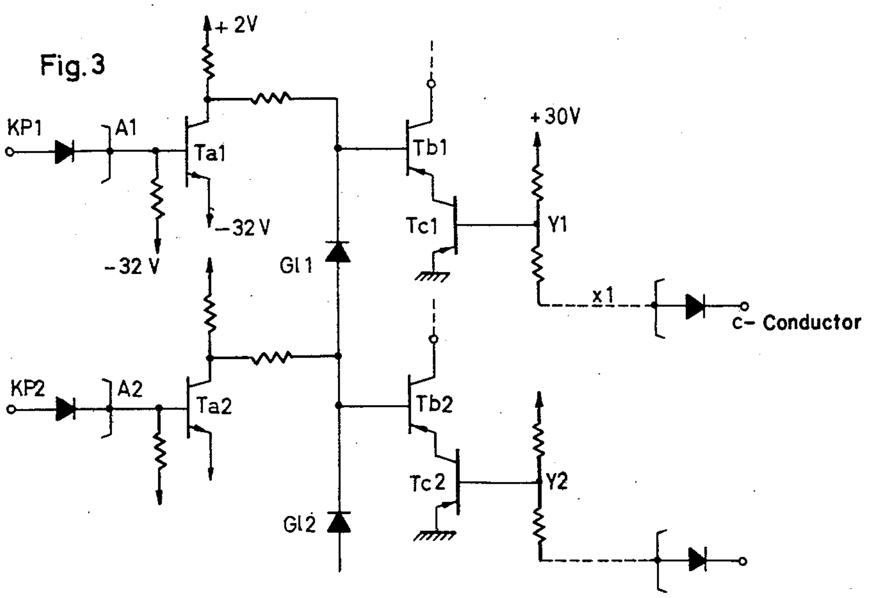
FIGS. 3 and 4 show supplemental circuits.
Figure 4:
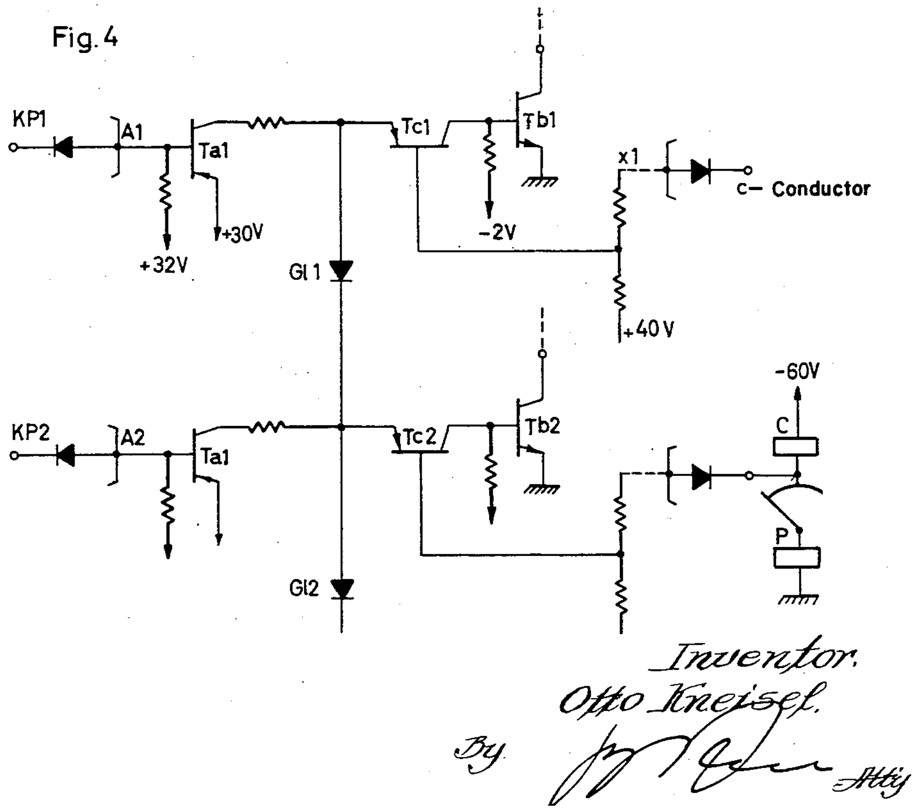

In the event that no disconnecting contacts are available in the outgoing transmissions of the different directions, an additional transistor circuit may take the place of the potential designating idle condition, controlled by the disconnecting contacts at the marking wires $x1$ to $x4$ to the selector outputs, as shown in FIGS. 3 and 4.

In the circuit shown in FIG. 3, the additional transistors T$c$1 . . . T$cn$ are respectively connected to the emitter of the output transistors T$b$1 . . . T$bn$, while the base is affected directly via the conductors $x1$, $x2$ . . . and the multiple indirectly by the potential of the private conductors $c$ of the outgoing trunks. As long as one trunk of the group is still idle, the potential of the unoccupied $c$-conductor affects a corresponding unblocking potential at point $y1$. The transistor T$c$1 thereby becomes conductive and applies approximately ground potential as idle potential to the emitter of the output transistor T$b$1.

FIG. 4 shows a circuit in which positive voltages are used for the transistors of the selector. The additional transistor T$c$1 which controls the disconnecting and which also is controlled directly by the potential of the $c$-conductors of the corresponding trunk group must then be placed in the base line of the output transistor T$b$ due to the predetermined potentials of the $c$-conductors.

The seizure conditions of the trunks may change during the operating time of the decoder or translator, and as a result, false results might occur. For instance, let us assume that the output KA1 is marked via the selector input A1. If now during the attraction time of relay EK1 the disconnecting contact $g1$ opens because the last idle trunk has been seized, the transistor T$b$1 will be blocked and the transistor T$b$2 will become conductive via rectifier G11.

In unfavorable cases, both relays EK1 and EH1 may be energized. Since the relays EK1 and EH1 are only symbols for relay combinations, the register cannot recognize the error. Corresponding errors may occur when the output HA1 is marked via the input A1, and rectifier G11, and a trunk of the direction KA1 becomes idle during the attraction time of relay EH1, that is, contact $g1$ closes.

In order to exclude this possibility of error, there is provided, in accordance with a further feature of the invention, a supervisory circuit which determines whether the evaluation result changes during the operating time of the decoder. In this case, the connection is automatically switched to the code path by a supervisory relay.

Figure 5:
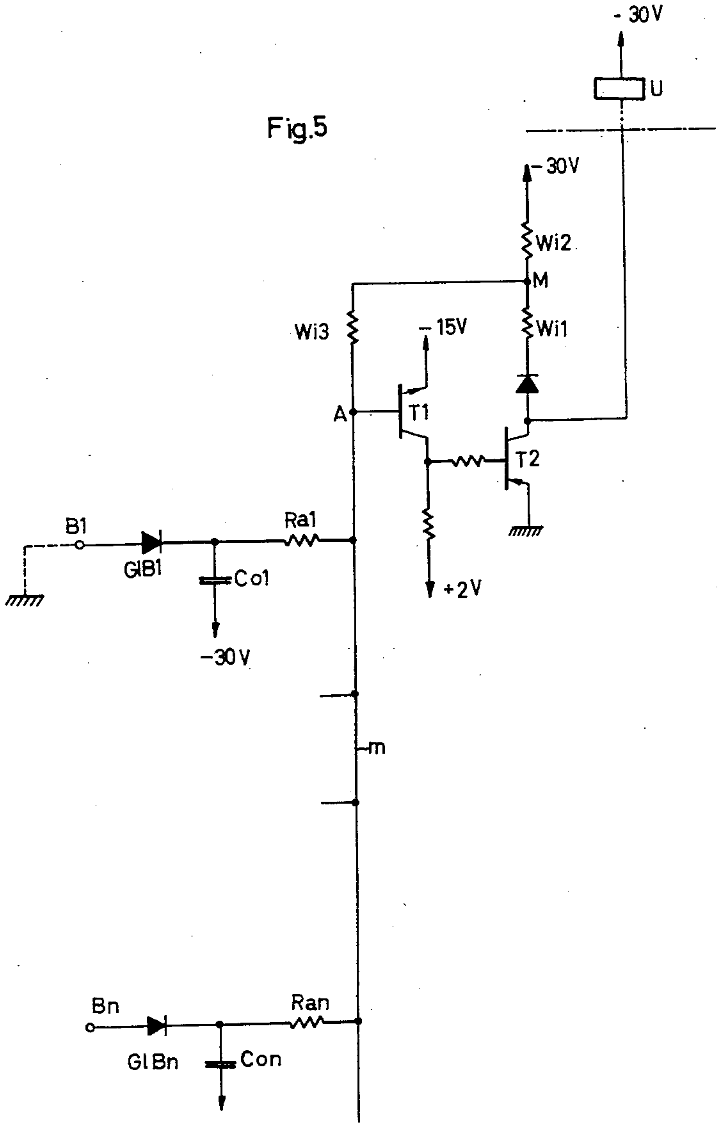
FIG. 5 shows a supervisory circuit.

The supervisory circuit is shown in FIG. 5 and should be examined in connection with FIG. 2. To the points B1 . . . B$n$ in the collector circuit of transistors T$b$1 . . . T$bn$ (FIG. 2), there are connected the two transistors T1, T2 via the rectifier G1B1, resistor R$a$1 or rectifier G1B$n$, resistor R$an$, common trunk $m$. Let us assume that the decoder has marked a connection in the direction KA1 and, since trunks were still idle in this direction, the output transistor T$b$1 was unblocked. During the flow of current in the emitter-collector circuit of this transistor over the result relay EK1, the resistance of the transistor is low and accordingly the voltage drop in the transistor is also low so that the point B1 is approximately at ground potential. If the seizure condition of the trunks of direction KA1 now suddenly changes in such a manner that all trunks become seized, ground is removed from trunk $x1$ and thus from the emitter of transistor T$b$1 while on the other hand some other output transistor T$bn$ becomes conductive via the rectifier G11 or G12 or G14 and thus another point B for instance B$n$ (FIG. 5) also comes approximately to ground potential.

In normal condition, the transistors T1 and T2 are blocked. If point B1 is grounded, then as a result of the flow of current:

Ground, B1, G1B1, R$a$1, A, W$i$3, W$i$2, −30 v.

point A is more negative than the emitter voltage of −15 volts. Transistor T1 and with its transistor T2 remain blocked. If the seizure condition of the direction KA1 changes, ground potential is removed from point B1 but is stored in the capacitor C$o$1, the rectifier G1B1 blocking it against discharge. At the same instant, ground potential is at point B$n$ whereby on the one hand the capacitor C$on$ is charged and on the other hand the following circuit is prepared via the two parallel resistors R$a$1, R$an$:

$$\frac{\text{Ground, Co1, Ra1}}{\text{Ground, Bn, G1Bn, Ran}}, m, A, Wi3, Wi2, -30\text{ v.}$$

The voltage drop over the two parallel resistors is now smaller so that point A assumes a more positive potential than the emitter voltage of −15 v. As a result, current now flows in the emitter-base circuit; the transistor T1 becomes conductive and now unblocks transistor T2. Due to current flow in the emitter-collector circuit of transistor T2, the supervisory relay U in the register is energized and directly marks the code path. Parallel to the supervisory relay U, a current flows over the emitter-collector circuit of transistor T2 and resistors W$i$1, W$i$2. As a result, point M between the two resistors receives a lower negative potential of about −18 v. and point A receives an even lower negative potential, for instance −10 volts, due to the voltage drop at the resistor W$i$3 in the circuit:

Ground, B$n$, G1B$n$, R$an$, $m$, A, W$i$3, −18 v.

By this feedback, the two transistors T1 and T2 remain conductive, even when the capacitor C$o$1 is discharged and only the point B$n$ is still at ground. Only upon the disconnecting of the decoder from the register does the supervisory circuit return to normal condition since the ground is then removed from the points B1 . . . B$n$.

Changes may be made within the scope and spirit of the appended claims.

I claim:

1. An electronic selector system including an electronic selector which is adapted to effect by-pass routing operations in the extension of connections in a telephone system and the like, said selector having a plurality of inputs, a plurality of switching stages, each of which is provided with an input and an output, comprising means for connecting predetermined potentials to the respective outputs to mark respectively the idle or busy condition thereof, means for marking desired inputs respectively involved in the extension of a connection by connecting a predetermined potential thereto, means including an electronic switch for connecting each input with an output respectively allotted thereto, means, each including rectifier means disposed between the input electrode of a respective electronic switch and the output of another electronic switch for further connecting each stage input in predetermined sequence with electronic switches of other stages, the marking potential connected to an input involved in the extension of a connection, when the output allotted to such input is idle, being operative to actuate the electronic switch respectively associated therewith and thereby vary said marking potential at the input of such electronic switch to prevent responsive thereto operative actuation of other electronic switches, and in the presence of busy condition of the corresponding output, being operative to actuate the electronic switch allotted to the next output marked idle, whereby the input involved in the extension of a connection is routed to an idle output.

2. An electronic selector system according to claim 1, comprising two-stage transistor amplifier means for respectively connecting corresponding input and output circuits, said rectifier means being respectively disposed between transistor means of two stages, and providing a coupling path therebetween.

3. An electronic selector system according to claim 2, comprising marker conductor means for connecting to the output transistor means potentials for characterizing the idle condition thereof.

4. An electronic selector system according to claim 3, comprising relay contact means for connecting said potentials.

5. An electronic selector system according to claim 3, comprising further transistor means for connecting said potentials.

6. An electronic selector system according to claim 3, comprising further transistor means, means for connecting said further transistor means in the base line of the output transistor means, said further transistor means being controlled by the potential designating idle condition.

7. An electronic selector system according to claim 1, comprising a translating device common to a plurality of incoming lines, a direction-determining switch, the outputs of said selector marking in said direction-determining switch directions of traffic routing, the inputs of said selector corresponding to different directions of traffic, means controlled by said translating device for marking said inputs by a predetermined potential, said translating device evaluating the code numerals designating the desired direction of traffic, result relay means controlled by way of the outputs of said selector, said result relays marking the corresponding traffic directions in said traffic-determining switch.

8. An electronic selector system according to claim 7, comprising for each traffic direction, at the direction-determining switch, a selector input and two serially connected transistor amplifiers and a selector output, the input transistor being controlled by the marking potential of the input for operatively affecting the output transistor in the presence of potential indicating idle condition of the individual lines of the marked line group.

9. An electronic selector system according to claim 8, comprising means for disconnecting the potential indicating idle condition from the marking conductor of the selector output upon seizure thereof, coupling rectifiers, and means effective upon seizure of all lines of a marked line group for routing the marked selector input over said coupling rectifiers to the next selector output extending in a different traffic direction and characterized as being idle.

10. An electronic selector system according to claim 8, comprising further transistor means which is controlled by said potentials lying on the private conductors of a line group and being effective to control the output transistor means.

11. An electronic selector system according to claim 2, comprising a common electronic switching device having two serially connected transistors, means for branching from the collectors of the output transistors a circuit to said common electronic switching device including in parallel connection said result relays and blocking rectifier means and resistor means, said common electronic switch becoming conductive upon blocking of a conducting output transistor and placing in unblocking condition another output transistor.

12. An electronic selector system according to claim 11, comprising capacitor means in the branches extending from said output transistors to said common electronic switch, said capacitor means being effective to store the potential marking the conductivity of the blocked transistor for an interval until such potential together with the potential marking the conductivity of the second output transistor can effect the unblocking potential for the electronic switch over parallel resistors in the two branch circuits.

13. An electronic selector system according to claim 12, comprising a supervising relay, means controlled by the output transistor of said electronic switch upon unblocking thereof for operatively connecting said supervising relay, means controlled by said supervising relay for disconnecting previously marked connecting paths and for switching over to the code path, means also controlled by said supervising relay for feeding current to a voltage divider, feedback means including a resistor, extending from said voltage divider to the input transistor to maintain the first transistor conductive.

References Cited in the file of this patent

UNITED STATES PATENTS

| | | |
|---|---|---|
| 2,629,019 | Lesigne | Feb. 17, 1953 |
| 2,640,883 | Buchner | June 2, 1953 |
| 2,763,722 | Six et al. | Sept. 18, 1956 |
| 2,779,822 | Ketchledge | Jan. 19, 1957 |